United States Patent [19]

Harrison et al.

[11] Patent Number: 4,497,505
[45] Date of Patent: Feb. 5, 1985

[54] VEHICLE SUSPENSION SYSTEMS

[75] Inventors: Anthony W. Harrison, Birmingham; Robert J. Goudie, Solihull, both of England

[73] Assignee: Lucas Industries Public Limited Company, Birmingham, England

[21] Appl. No.: 436,664

[22] Filed: Oct. 26, 1982

[30] Foreign Application Priority Data

Nov. 5, 1981 [GB] United Kingdom ............... 8133329

[51] Int. Cl.³ .............................................. B60G 3/00
[52] U.S. Cl. ...................................... 280/698; 280/714
[58] Field of Search ............... 280/689, 698, 708, 714

[56] References Cited

U.S. PATENT DOCUMENTS 4,052,088 10/1977 Nicholls .............................. 280/708
4,393,959 7/1983 Acker ................................. 280/714

FOREIGN PATENT DOCUMENTS 638893 3/1962 Canada ............................... 280/708
2505841 8/1976 Fed. Rep. of Germany ...... 280/698
148606 11/1980 Japan ................................. 280/689
2033853 5/1980 United Kingdom .
2040839 9/1980 United Kingdom ............... 280/714

Primary Examiner—David M. Mitchell
Assistant Examiner—Ross Weaver
Attorney, Agent, or Firm—Scrivener Clarke Scrivener and Johnson

[57] ABSTRACT

A vehicle suspension system provides independent suspension for each wheel, with the load on each wheel being supported by a gas spring which has a volume of gas for supporting the load, and a volume of hydraulic fluid through which movement of the wheel is transmitted to the gas. In order to produce substantially constant vehicle handling for all load conditions of the vehicle, the suspension for the rear wheels includes a torsion bar, and a connection is provided between the hydraulic fluid volumes of the rear gas springs to allow flow of hydraulic fluid between the rear gas springs. The fluid may flow freely or through an orifice and relief valve assembly.

20 Claims, 6 Drawing Figures

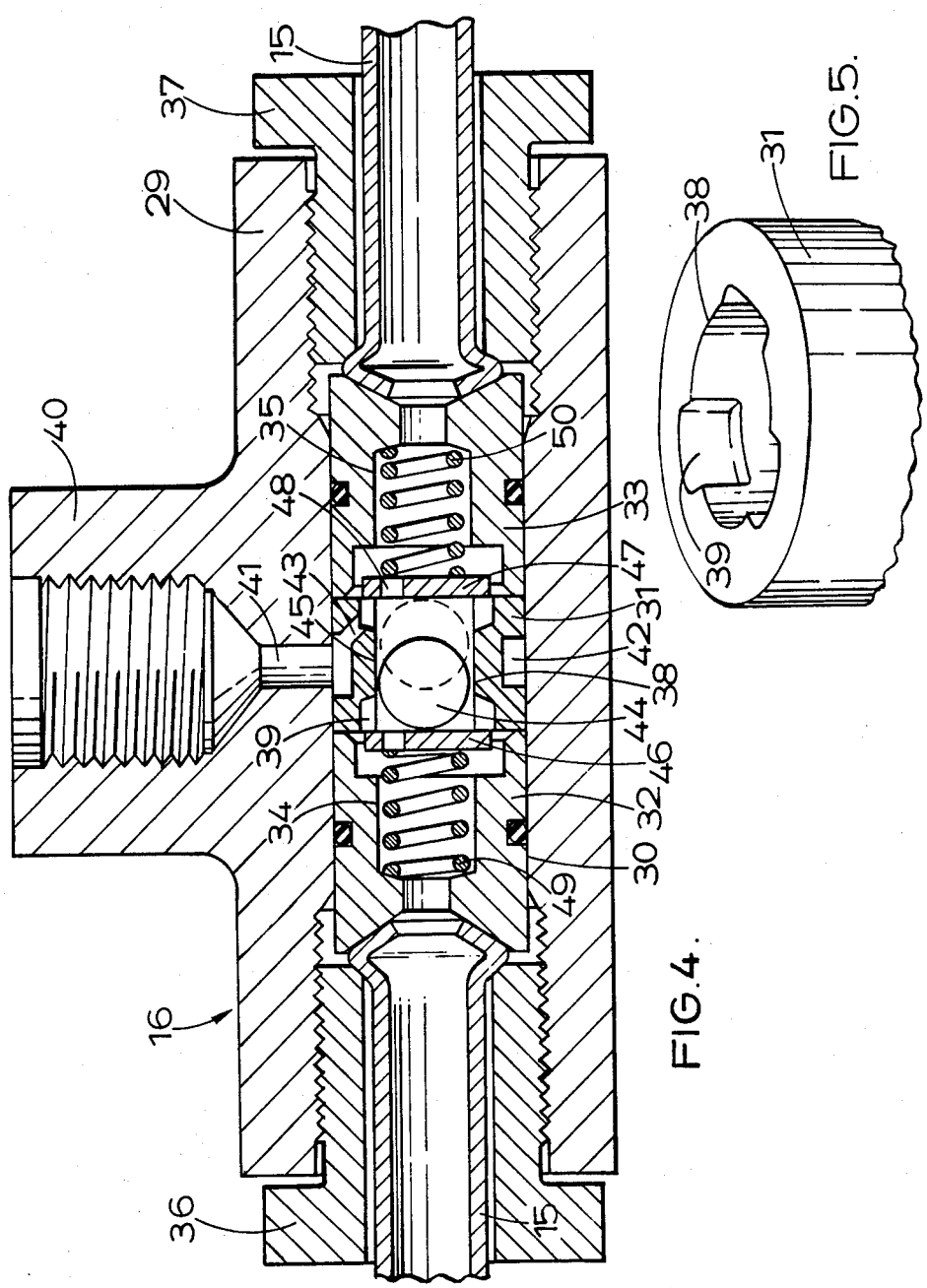

VEHICLE SUSPENSION SYSTEMS

This invention relates to vehicle suspension systems of the kind in which the load on each wheel is supported by a gas spring comprising a volume of gas for supporting the load and a volume of hydraulic fluid through which movement of the wheel is transmitted to the gas.

In a vehicle provided with an independent suspension system providing independent suspension for each wheel the loading of the vehicle affects the handling characteristics, since increasing the load on the vehicle normally displaces the centre of gravity rearwardly, which tends to induce oversteer. The oversteer can be countered to some extent by increasing the roll stiffness of the suspension of the front wheels relative to that of the rear wheels. When the vehicle is provided with steel springs for supporting the wheels this oversteer effect is relatively easy to predict and to counter, since the front suspension will have substantially constant roll stiffness at all loads (provided the bump and rebound stops are clear). However, with gas springs any increase in the load on the vehicle causes an increase in the roll stiffness of the suspension as well as in the bounce stiffness. Thus when the vehicle is laden there will be a greater increase in the roll stiffness of the rear wheel springs, which take a greater proportion of the load, than in the roll stiffness of the front wheel springs, resulting in an increase in the roll stiffness of the rear suspension relative to that of the front suspension. This therefore increases the oversteer induced by the displacement of the centre of gravity because of the vehicle loading.

According to our invention in a vehicle suspension system of the kind set forth the suspension for the rear wheels includes a torison bar, and a connection is provided between the hydraulic fluid volumes of the gas springs supporting the rear wheels to allow flow of hydraulic fluid between the gas springs for the rear wheels.

The fluid flow permitted by the connection means that the roll stiffness of the rear gas springs is not affected by the loading of the vehicle, so that the roll stiffness of the rear suspension is determined principally by the characteristics of the torison bar. However, the roll stiffness of the gas springs for the front wheels increases as the load on the vehicle increases. Under load therefore the roll stiffness of the front suspension is increased relative to the roll stiffness of the rear suspension, thus providing the necessary adjustment to counter the oversteer induced by the load. Thus the vehicle tends to have consistent handling characteristics under all load conditions. However, the connection between the rear gas springs does not alter the increase in bounce stiffness of the springs which is required with an increase in load.

The connection may be arranged to permit free fluid flow between the rear springs at all times. This prevents any transient roll stiffness being developed in the rear gas springs, that is, a change in roll stiffness generated by a rapid rate of change of roll angle of the vehicle such as, for example, may occur due to a rapid change in direction of the vehicle.

However, the provision of such transient roll stiffness in the rear suspension may be advantageous, as it causes a transient oversteer effect, which may improve the steering response of the vehicle during sudden manoeuvres. Preferably, therefore, the connection is provided with means for producing transient roll stiffness in the rear gas springs under certain conditions.

Preferably this means comprises an orifice incorporated in the connection to limit the rate of fluid flow between the fluid volumes of the springs in each direction.

The transient roll stiffness will be some function of the rate of change of roll angle according to the flow characteristic of the orifice. For example, a short orifice will produce a pressure differential which is substantially proportional to the square of the rate of change of roll angle. This means that for small roll velocities the orifice will have little effect and the transient roll stiffness will increase rapidly at larger roll velocities.

Further, it may also be advantageous to limit the amount of transient roll stiffness that can be developed.

Preferably therefore the connection incorporates means for limiting the amount of transient roll stiffness produced by the springs.

Preferably, these limiting means comprise a relief valve means incorporated in the connection, the relief valve means being operative for each direction of fluid flow to limit to a threshold level the pressure differential across the orifice caused by the restriction of flow through the orifice, thus limiting the amount of transient roll stiffness that can be developed. Conveniently the relief valve means includes a valve which is operative, when the pressure differential exceeds the threshold level, to allow a rate of fluid flow between the springs which is greater than a predetermined level.

When the relief valve means has a blow-off characteristic and is used in a connection with no significant orifice, limited static roll stiffness can be developed.

The relief valve means may comprise two oppositely-acting relief valves. These may be arranged in parallel, or in series. Alternatively a single valve member may be arranged to act as a relief valve for both directions of fluid flow.

Preferably the orifice and relief valve means are incorporated in a single assembly. The orifice is conveniently provided on the valves.

An embodiment of our invention is shown in the accompanying drawings, in which:

FIG. 4 is a section through a further orifice and relief valve assembly;

FIG. 5 is a perspective view of part of the relief valve of FIG. 4; and

Figure 1:
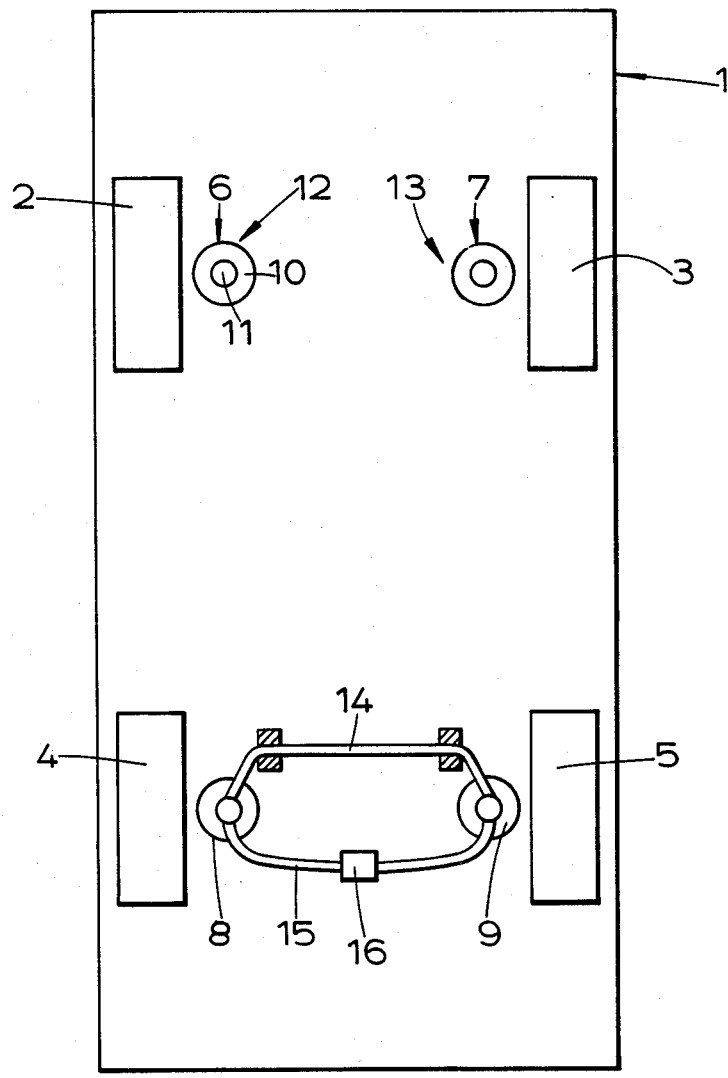
FIG. 1 is a schematic underneath plan of a vehicle showing part of the suspension system.

FIG. 1 shows a vehicle 1 having a pair of front wheels 2, 3 and a pair of rear wheels 4, 5. The vehicle 1 is provided with a suspension system (part only of which is shown in the drawing). It is convenient to consider the suspension system as two parts, the suspension for the front wheels and the suspension for the rear wheels.

The suspension system includes for each wheel 2, 3, 4, 5 a respective gas spring 6, 7, 8, 9 for supporting the load on that wheel. Each gas spring is of a known constant mass type, which has a constant mass of gas or air, provided in a chamber 10, for supporting the load, and a fluid chamber 11 which may be separated from the gas by a flexible diaphragm or a floating piston. Hydraulic fluid in the fluid chamber 11 is acted on by a piston (not shown) which transmits the movement of the wheel to the fluid, which in turn transmits it through the diaphragm or floating piston to the gas. The gas springs affect the roll stiffness and bounce stiffness of the front and rear suspension. Both the roll stiffness and the bounce stiffness of a gas spring increase when the load on the vehicle is increased, and this affects the total roll stiffness and bounce stiffness of the front suspension and the rear suspension.

The gas springs 6, 7 for the front wheels 2, 3 are incorporated in hydraulic levelling suspension struts 12, 13. In such an hydraulic levelling strut a control valve is operable to regulate the volume of hydraulic fluid in the fluid chamber in order to maintain the length of the strut at a predetermined value, irrespective of the load on the wheel. The front suspension is not provided with a torsion (or anti-roll) bar.

The rear suspension, however, is provided with a torsion bar 14. The gas springs 8, 9 for the rear wheels 4, 5 are connected to a single levelling channel and the fluid chambers 11 of the rear gas springs 8, 9 are connected by a pipe 15 which also incorporates an orifice and relief valve assembly 16, which is shown in more detail in FIGS. 2 and 3.

Figure 2:
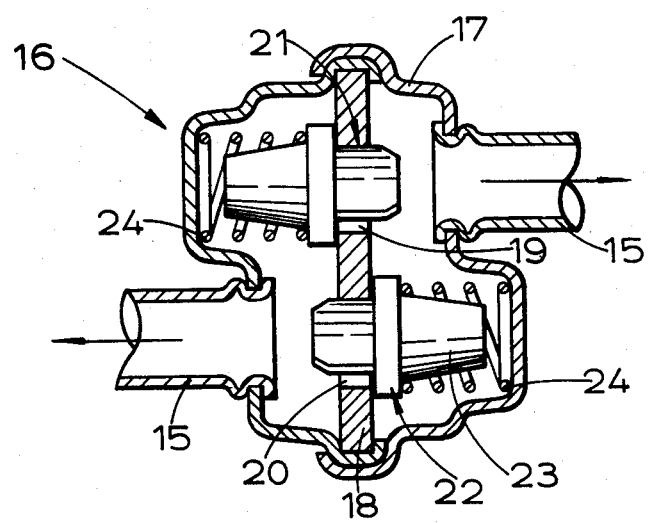
FIG. 2 is a section through an orifice and relief valve assembly.
Figure 3:
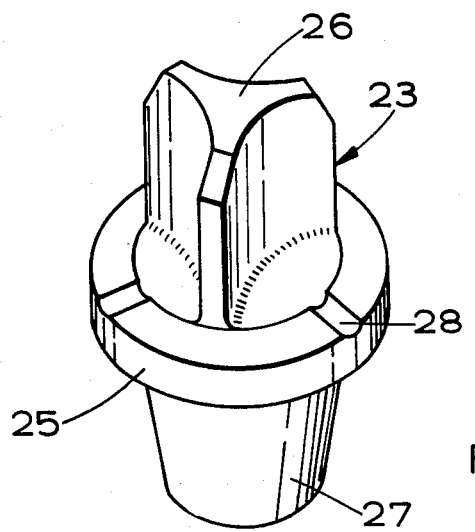
FIG. 3 is a perspective view of a valve member of FIG. 2.

The assembly 16 shown in FIG. 2 has a housing 17 assembled from steel pressings, divided into two by a valve plate 18. The valve plate 18 has two circular apertures 19, 20, fluid flow through which is controlled by relief valve means in the form of relief valves 21, 22 which are oppositely-acting and arranged in parallel. The valves 21, 22 are similar in construction, each comprising a moulded plastics valve member 23 (shown in detail in FIG. 3) which is biassed to close the aperture by means of a spring 24. Each valve member 23 has an annular seating portion 25 from which projects a guide portion 26 to guide the valve member 23 in the aperture, and a frusto-conical portion 27 which provides a guide for the spring 24. One or both valve members 23 may be provided with self-cleaning bleed orifices 28 (see FIG. 3) on the seating portion 25 to provide flow past the valves 21, 22 at all times, but also to limit the rate of flow. This causes a pressure differential to develop across the orifice, and for example, if the fluid flow is from left to right as shown in FIG. 2, a greater pressure will develop on the left-hand side of the valve plate 18. The pressure differential also acts on the valves 21, 22 and at a threshold level overcomes the force in the spring 24 of the appropriate valve, in this case the valve 22. The valve 22 therefore opens to prevent further rise of pressure differential. Thus the relief valves 21, 22 are operative to limit to the threshold level the pressure differential across the orifice 28, one valve being operative for each direction of fluid flow.

In the vehicle 1, fluid tends to flow between the hydraulic fluid volumes of springs 8, 9 via the pipe 15 and the assembly 16 when the vehicle rolls, as when cornering. The predetermined level is chosen to correspond to the rate of flow created by the maximum rate of change of roll angle consistent with normal driving conditions. If the rate of flow is below the predetermined level, as it normally will be, free fluid flow is permitted, so that the roll stiffness of the rear springs 8, 9 is not affected by the load on the vehicle. The bounce stiffness characteristics of the springs 8, 9 are not affected by the connection, and so the bounce stiffness of the springs increases as the load on the vehicle increases.

Thus in the normal situation the total roll stiffness of the rear suspension is determined by the roll stiffness of the torsion bar 14 which is substantially constant for all loads. The total roll stiffness of the front suspension under any vehicle load however, will be determined by the front springs 6, 7, since for the front springs the roll stiffness depends on the loading of the vehicle.

This has the result that the vehicle 1 will tend to handle consistently at all loads. For example, if the vehicle suspension is set up so that the vehicle has neutral handling when it is unladen, loading the vehicle normally displaces the centre of gravity rearwardly, which induces a tendency to oversteer. The roll stiffness of the rear suspension, which is determined by the roll stiffness of the torsion bar 14, remains substantially constant, while the increased load on the vehicle increases the roll stiffness of the front springs 6, 7 and thus of the front suspension as a whole. Thus the roll stiffness of the front suspension increases relative to that of the rear suspension, and counters the tendency to oversteer. The bounce stiffness of all the springs 6, 7, 8, 9 increases in order to cope with the increased load on the vehicle.

However, if the rate of flow between the fluid volumes of the rear springs exceeds the predetermined level, the orifice 28 restricts the flow through the assembly 16 which causes transient roll stiffness to develop in the rear springs 8, 9. The amount of transient roll stiffness is limited by the operation of the valves 21, 22 which limit the pressure differential across the orifice 28. Transient roll stiffness is normally developed in a gas spring because of rapid rates of change of the roll angle of the vehicle, which may occur in sudden manoeuvres, such as rapid changes in direction. The provision of transient roll stiffness causes a transient oversteer effect, which may improve the steering response during sudden manoeuvres.

If preferred, in a modification, the assembly 16 is omitted, and the pipe 15 is arranged to allow fluid flow between the rear springs 8, 9 under all conditions, which prevents transient roll stiffness being developed in the springs.

In another modification the valves 21, 22 have blow-off characteristics and are used in connection with no significant orifices. This enables limited static roll stiffness to be developed.

FIGS. 4 and 5 show an alternative orifice and relief valve assembly 16, in which a single valve member is arranged to act as a relief valve for both directions of fluid flow. The assembly 16 has a T-shaped housing 29 provided with a longitudinal bore 30. A valve guide 31 is located centrally in the bore 30, between plug member 32, 33, each of which has a stepped bore 34, 35. End caps 36, 37 screw into respective ends of the bore 30, and each end cap retains an end of the pipe 15 in the bore 30 against a respective plug member 32, 33. Fluid thus flows between the ends of the pipe 15 through the plug members 32, 33 and the valve guide 31, which has an axial bore 38, and recesses 39 provided at each end, as shown in FIG. 5.

The housing 29 also conveniently provides a connection between the pipe 15 and a suspension levelling system, so that if this embodiment is used, the gas springs 8, 9 for the rear wheels 4, 5 may be incorporated in hydraulic levelling suspension struts. The connection to the levelling system is provided through the other arm 40 of the housing 29, which has an inlet 41 communicating with an annular groove 42 in the valve guide 31. An inclined passage 43 in the guide 31 leads from the groove 42 to one of the recesses 39 to provide fluid communication between the pipe 15 and the inlet 42, so that fluid can be supplied to or removed from the hydraulic fluid volumes of the gas springs 8, 9.

A valve member in the form of a ball 44 is located with clearance in the bore 38, and the clearance provides the orifice 45 for limiting the rate of fluid flow through the assembly 16 of the predetermined level. The ball 44 is retained in the guide 31 by end plates 46, 47, each of which has an aperture 48 to allow fluid flow. Each end plate 46, 47 is biassed into engagement with an axial end of the guide 31 by a respective spring 49, 50. The springs 49, 50 are located in the bores 34, 35 of the plug members 32, 33. For each direction of fluid flow the ball 44 co-operates with one of the spring-loaded end plates 46, 47 to act as a pressure relief valve to limit the pressure differential across the orifice 45 to the threshold level.

Thus in operation fluid flows freely at a rate up to the predetermined level, but if the rate exceeds the predetermined level the orifice 45 restricts the flow. The pressure differential which is created by this acts to displace the ball 44 against the appropriate spring-loaded end plate, say 46. At the threshold level of pressure differential the force in the spring 49, is overcome and the ball 44 moves to open communication between the recesses 39 and the bore 38, thus allowing a greater rate of fluid flow through the assembly 16.

However, in this assembly different springs 48, 49 control the threshold level of pressure differential in each direction of fluid flow. This has the disadvantage that the threshold level may be different for each direction of fluid flow.

Figure 6:
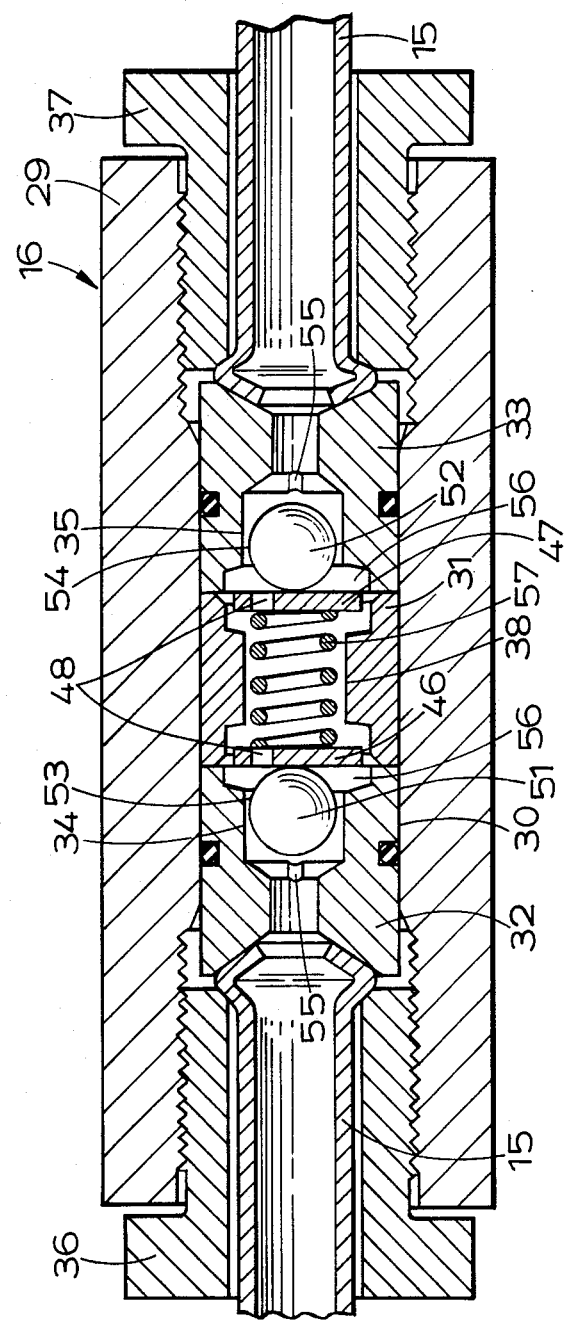
FIG. 6 is a section through another orifice and relief valve assembly.

FIG. 6 shows a modified assembly 16 which overcomes this disadvantage, by providing two oppositely acting relief valves in series, which act against a single spring. FIG. 6 shows an assembly similar to that shown in FIGS. 4 and 5, and corresponding reference numerals have been applied to corresponding parts.

FIG. 6 does not show any provision for connection to a levelling system, although clearly this could be provided. A first valve member in the form of a ball 51 is located in the bore 34 of the plug member 32, and a second similar valve member 52 is located in the bore 35 of the plug member 33. A clearance is provided between the balls 51, 52 and their respective bores 34, 35 to form orifices 53, 54 to limit fluid flow to the predetermined level. As the plug members 32, 33 and the balls 51, 52 are identical, the orifices 53, 54 will have the same characteristics. Grooves 55 are provided in each bore 34, 35 to ensure fluid flow when the ball 51 or 52 is in its outermost position, and recesses 56 are provided at the inner ends of each plug member 32, 33. A single spring 57 is located in the valve guide 31, and acts to bias the end plates 46, 47 against adjacent ends of the plug members 32, 33 so that each ball 51 or 52 and its respective plate 46, 47 forms a relief valve.

In operation fluid flows freely at a rate up to the predetermined level, but if the rate exceeds the threshold level the orifices 53, 54 restrict flow. The resulting pressure differential acts on the balls 51, 52, displacing one, say 51, against the spring-loaded end plate 46, and the other 52 towards the outer end of the bore 35 in which it is located, with the grooves 55 ensuring that flow continues. The ball 51 which is displaced against the end plate 46 acts as the pressure relief valve, and at the threshold level of pressure differential overcomes the force in the spring 57 to open communication between the recesses 56 and the bore 34 to allow a greater rate of fluid flow.

We claim:

1. A vehicle suspension system for a vehicle with front and rear wheels, wherein the load on each of said front and rear wheels is supported by a gas spring comprising a volume of gas for supporting said load and a volume of hydraulic fluid through which movement of said wheel is transmitted to said volume of gas, said suspension system providing independent suspension for each of said front and rear wheels, and comprising suspension for said front wheels and suspension for said rear wheels, said suspension for said front wheels being so constructed and arranged that a roll stiffness of said suspension for said front wheels increases with an increase in said load on said front wheels, and said suspension for said rear wheels includes a torsion bar, and a connection is provided between said hydraulic fluid volumes of said gas springs supporting said rear wheels, said connection being constructed and arranged to allow flow of hydraulic fluid between said gas springs supporting said rear wheels.

2. A vehicle suspension system as claimed in claim 1, wherein said connection is constructed and arranged to permit free fluid flow at all times between said gas springs supporting said rear wheels, to prevent any transient roll stiffness being developed in said gas springs supporting said rear wheels.

3. A vehicle suspension system as claimed in claim 1, wherein said connection is provided with means for producing transient roll stiffness in said gas springs supporting said rear wheels.

4. A vehicle suspension system as claimed in claim 3, wherein said means for producing transient roll stiffness in said gas springs supporting said rear wheels comprises an orifice incorporated in said connection, said orifice being adapted and constructed to limit the rate of fluid flow in each direction between said hydraulic fluid volumes of said gas springs supporting said rear wheels.

5. A vehicle suspension system as claimed in claim 3, wherein limiting means is provided for limiting the amount of transient roll stiffness produced by said gas springs supporting said rear wheels.

6. A vehicle suspension system as claimed in claim 4, wherein limiting means is provided for limiting the amount of transient roll stiffness produced by said gas springs supporting said rear wheels.

7. A vehicle suspension system as claimed in claim 6, wherein said limiting means comprises a relief valve means incorporated in said connection, said relief valve means being operative for each direction of fluid flow to limit to a threshold level a pressure differential across said orifice caused by restriction of flow through said orifice.

8. A vehicle suspension system as claimed in claim 7, wherein said relief valve means includes a valve which is operative when said pressure differential exceeds said threshold level to allow a rate of fluid flow between said gas springs supporting said rear wheels which is greater than a predetermined level.

9. A vehicle suspension system as claimed in claim 7, wherein said relief valve means has a blow-off characteristic and is used within a connection with no significant orifice whereby limited static roll stiffness can be developed.

10. A vehicle suspension system as claimed in claim 7, wherein said relief valve means comprises two oppositely-acting relief valves arranged in parallel.

11. A vehicle suspension system as claimed in claim 8, wherein said relief valve means comprises two oppositely-acting relief valves arranged in parallel.

12. A vehicle suspension system as claimed in claim 9, wherein said relief valve means comprises two oppositely-acting relief valves arranged in parallel.

13. A vehicle suspension system as claimed in claim 7, wherein said relief valve means comprises two oppositely-acting relief valves arranged in series.

14. A vehicle suspension system as claimed in claim 8, wherein said relief valve means comprises two oppositely-acting relief valves arranged in series.

15. A vehicle suspension system as claimed in claim 9, wherein said relief valve means comprises two oppositely-acting relief valves arranged in series.

16. A vehicle suspension system as claimed in claim 7, wherein said relief valve means comprises a single valve member constructed and arranged to act as a relief valve for both directions of fluid flow.

17. A vehicle suspension system as claimed in claim 8, wherein said relief valve means comprises a single valve member constructed and arranged to act as a relief valve for both directions of fluid flow.

18. A vehicle suspension system as claimed in claim 9, wherein said relief valve means comprises a single valve member constructed and arranged to act as a relief valve for both directions of fluid flow.

19. A vehicle suspension system as claimed in claim 7, wherein said orifice and said relief valve means are incorporated in a single assembly.

20. A vehicle suspension system as claimed in claim 19, wherein said orifice is provided on said relief valve means.

* * * * *